UNITED STATES PATENT OFFICE.

KATHARINE CONWAY, OF PHILADELPHIA, PENNSYLVANIA.

TOILET-CREAM.

SPECIFICATION forming part of Letters Patent No. 444,743, dated January 13, 1891.

Application filed October 31, 1890. Serial No. 369,951. (No specimens.)

*To all whom it may concern:*

Be it known that I, KATHARINE CONWAY, a citizen of the United States, and a resident of Philadelphia, in the county of Philadelphia and State of Pennsylvania, have invented certain new and useful Improvements in Toilet-Cream; and I do declare the following to be a full, clear, and exact description of the invention, such as will enable others skilled in the art to which it appertains to make and use the same.

This invention has relation to cosmetics or compounds for treating the skin; and it consists of the composition compounded of the ingredients and in the proportions and manner hereinafter set forth.

The object of the invention is to produce a compound for removing from the skin discolorations, such as sunburn, tan, and freckles, also for alleviating the irritation caused by chapping, cracked lips, and all blemishes and roughness incidental to undue exposure of the skin.

My composition consists of the ingredients compounded in or about the following proportions and manner, viz: vaseline, (white,) one pound; white wax, one and one-half ounce; borax, one ounce; starch-powder, two drams; rose-water, two fluid ounces; distilled water, two fluid ounces; extract of crab-apple, two fluid ounces.

The vaseline is first heated over boiling water until it reaches the boiling-point, and in the meantime the wax, which has been cut fine, is gradually incorporated with the boiling vaseline, while the other ingredients, with the exception of the extract of crab-apple, are added slowly, the resulting mixture being beaten with a silver fork or other suitable instrument until it assumes the consistency of cream, thus becoming an unctuous mass. As the heat is dissipated, the crab-apple extract, which is a perfume, is added and thoroughly incorporated with the mass by the beating process hereinbefore referred to.

The object in adding the perfume last is that the latter, being volatile, would be more or less reduced in strength by the action of the heated mass.

When the ingredients forming the compound have been treated as previously stated, the whole is remelted and strained, after which the article is ready for use, being usually stored in pots or boxes of the size and form selected for transport and display.

What I claim as my invention is—

The composition herein described, consisting of vaseline, white wax, borax, starch-powder, rose-water, distilled water, and extract of crab-apple, compounded substantially in the proportions and manner specified.

In testimony whereof I affix my signature in presence of two witnesses.

KATHARINE CONWAY.

Witnesses:
GEO. W. REED,
JOHN COCHRAN.